US007685002B2

(12) United States Patent
Scott et al.

(10) Patent No.: US 7,685,002 B2
(45) Date of Patent: Mar. 23, 2010

(54) METHOD AND SYSTEM FOR PROCESSING MEDICAL BILLING RECORDS

(75) Inventors: James L. Scott, Milton, MA (US); David Delaney, Wellesley Hills, MA (US)

(73) Assignee: MedAptus, Inc., Boston, MA (US)

( * ) Notice: Subject to any disclaimer, the term of this patent is extended or adjusted under 35 U.S.C. 154(b) by 289 days.

(21) Appl. No.: 11/840,289

(22) Filed: Aug. 17, 2007

(65) Prior Publication Data

US 2008/0281629 A1    Nov. 13, 2008

Related U.S. Application Data

(60) Provisional application No. 60/916,720, filed on May 8, 2007.

(51) Int. Cl.
G06Q 10/00 (2006.01)
G06Q 50/00 (2006.01)

(52) U.S. Cl. ........................................................ 705/2

(58) Field of Classification Search ..................... 705/2, 705/3
See application file for complete search history.

(56) References Cited

U.S. PATENT DOCUMENTS

| 5,325,293 | A  | * | 6/1994  | Dorne ................................ 705/2 |
| 5,835,897 | A  | * | 11/1998 | Dang ................................. 705/2 |
| 5,845,253 | A  |   | 12/1998 | Rensimer |
| 5,970,463 | A  | * | 10/1999 | Cave et al. ........................ 705/3 |
| 7,099,896 | B2 |   | 8/2006  | Fields |
| 7,110,955 | B1 |   | 9/2006  | Barhnart |
| 2001/0051880 | A1 | * | 12/2001 | Schurenberg et al. ............ 705/3 |
| 2002/0120466 | A1 | * | 8/2002  | Finn ................................. 705/2 |
| 2002/0123907 | A1 | * | 9/2002  | Strayer ............................. 705/2 |
| 2005/0114283 | A1 | * | 5/2005  | Pearson et al. .................. 706/50 |
| 2005/0152520 | A1 | * | 7/2005  | Logue ........................ 379/114.14 |

OTHER PUBLICATIONS

E/Point Online, ED Facility Charging, Lynx Medical Systems, date of publication unknown.

(Continued)

*Primary Examiner*—Gerald J. O'Connor
*Assistant Examiner*—Trang Nguyen
(74) *Attorney, Agent, or Firm*—Rajesh Vallabh; Foley Hoag LLP

(57) ABSTRACT

A computer implemented method, system, and computer program product are provided for processing professional and technical billing records relating to medical care provided to patients at a medical facility. The method includes (a) providing at a computer system a mapping of a set of professional billing codes and corresponding technical billing codes; (b) receiving at the computer system a professional billing record provided by a professional medical provider relating to medical services provided by the professional medical provider to a patient, the professional billing record comprising one or more professional billing codes; (c) identifying one or more technical billing codes corresponding to the one or more professional billing codes received in step (b) using the mapping, and providing the one or more technical billing codes to a user entering technical charges to a technical billing record to facilitate entry of technical charges relating to the medical care provided to the patient; (d) receiving at the computer system the technical billing record provided by the user, the technical charges comprising one or more technical billing codes; and (e) automatically reconciling the professional billing record and the technical billing record at the computer system to facilitate identification of errors or omissions in the one or more technical billing codes or the one or more professional billing codes.

31 Claims, 5 Drawing Sheets

OTHER PUBLICATIONS

Lumedx CardioCharge Charge Capture & Software Solution for Cardiology & Vascular Healthcare Providers, date of publication unknown.

Charge Capture, pdaMED, Virtual Intern Has The Fastest, Most Complete Visit/Procedure Reporting Available On Any PDA, Last modification date: Jan. 27, 1998.

Rapid Billing Capture, pdaMED, Last modification date: Jan. 27, 1998.

Grasso, Michael A., Clinical Applications of Palmtop Computing, data publication unknown.

Carpenter, John D., Handheld healthcare—handheld PCs with Microsoft's CE OS—includes related article on PHYSIX's PocketChart virtual charting application for handheld PCs—Technology Information, Health Management Technology, Dec. 1996.

Guadagnino, Christopher, Documentation and coding tools, Physician's News DIGEST, Jun. 1998.

* cited by examiner

FIG. 3

Technical Charge

Patient: Abe, Bob (idnumber77777777)
Date: 06/13/2007
In Progress [Change Status To: ▼]

Provider: Adams, John
Group: Cardiology
Location: MedAptus North Office
Sup. Provider:

[Actions]

*Login > Home Page > Technical Charge Capture Workstation > Technical Charge*

[Charges] [Edit History] [Current Activity]

Ru3 - You must check the "No Drugs/Materials" checkbox or add a drug/material code (1)

| | | |
|---|---|---|
| Appointment # | Visit Number | Reg. Status |
| Patient DOB  0101051180 | Global Winndows Click to display | Sub Location |
| Ins. Name  None | Ins. Code  N/A | |
| Reason for visit | | |

Note

Visit Click here to open worksheet ▶ — 304

Procedures (4) ▼ [Add] — 302

| Code | Description | | Units | | Source | |
|---|---|---|---|---|---|---|
| 1700362150 | SEL CATH PLACE ART 1ST ORD THO — 306 | | 1.0 | [Add Modifier] | Adams, John CPT: 36215 | ☐ MD Performed Procedure |
| 1700758960 | TRANSCATHETER THERAPY INFUSION — 308 | | 1.0 | [Add Modifier] | Adams, John CPT: 75896 | |
| ✗ 5906 | INITIAL PUMP CONNECT — 310 | | 1.0 | [Add Modifier] | User, Nurse technical-only | |
| ✗ 5823 | REFILLING/MAIN OF A PORTABLE PUMP — 312 | | 1.0 | [Add Modifier] | User, Nurse technical-only | |

☐ No Drugs/Materials  ☐ MD administered Drug

Drugs & Materials (0) ▼ [Add]

| Code | Description | Units | Source |
|---|---|---|---|

Diagnoses (2) ▼ [Add]

| Order | Code | Description | | | Source |
|---|---|---|---|---|---|
| 1 ▼ | 401.1 | Hypertension, Benten | | | Adams, John |
| 2 ▼ | 411.1 | Intermediate Coronary Syndrome | | | Adams, John |

[Complete] [Save] [Validate] [Cancel]

300

Visit (55 minutes) ▼

| Code | Description |
|---|---|
| X 191693920 | EST PT PREVENT MED 1 4 PUL |

| Staff Utilization | Time |
|---|---|
| ☑ Chart Prep | 5 |
| ☐ Escort Pt to Rm | |
| ☐ Transcribe Orders | |
| ☑ Retrieve Results | 5 |
| ☐ Retrieve X - Rays | |
| ☐ VS | |
| ☐ Direct Nsg Care | |
| ☐ Chaperone | |
| ☐ Teaching | |
| ☐ Spec process | |
| ☐ Follow - up Appt | |
| ☐ Documentation | |
| Total Staff Resources | 10 |

| Facility Utilization | Time |
|---|---|
| ○ Room 0 - 15 Minutes | |
| ○ Room 16 - 30 Minutes | |
| ● Room 31 - 45 Minutes | 45 |
| ○ Room 46 - 60 Minutes | |
| ○ Room > 60 Minutes | |

Total
Level 1 (<=15 Minutes)
Level 2 ( 16 - 29 Minutes)
Level 3 ( 30 - 45 Minutes)
Level 4 ( 46 - 60 Minutes)
Level 5 ( > 60 Minutes)

Clear Times

*Prof*  *Source*  *Modifiers*

99392 ⌄ Specialist1, TechRevenue

Add Modifier

| Enterprise Server: Add CDM Code - - Web Page Dialog | ✕ |

Add CDM Code

| Procedures | Materials/Drugs | Diagnoses | Search |

| Category | Code ▶ | Qty | Description |
|---|---|---|---|
| Cath (0/9) | ☐ 1700935010 | 1.0 | RIGHT HEART CATHETERIZATION |
| Drug Admins (0/5) | ☐ 1700758980 | 1.0 | ANGIOGRAPHY CATHETER FOLLOWUP |
| | ☐ 1700362000 | 1.0 | INTRO CATH AORTA |
| | ☐ 1700361450 | 1.0 | INTRO NEEDLE INTRCATH AV SHUNT |
| | ☐ 1700361400 | 1.0 | INTRO NEEDLE INTRACATH EXTR ART |
| | ☐ 1700361200 | 1.0 | INTRO CATH BRACHIAL ARTERY |
| | ☐ 1700361000 | 1.0 | ESTABLISH ACCESS TO ARTERY |
| | ☐ 1700360140 | 1.0 | SEL CATH PLACE PULM ARTERY |
| | ☐ 1700339680 | 0.0 | REM INTRA AORT BALLN ASST DEV |

[ Add ]　[ Select All ]　[ Clear ]　[ Cancel ]

METHOD AND SYSTEM FOR PROCESSING MEDICAL BILLING RECORDS

RELATED APPLICATION

This application claims priority from U.S. Provisional Patent Application No. 60/916,720 filed on May 8, 2007 and entitled Method and System for Processing Medical Billing Records, which is hereby incorporated by reference.

BACKGROUND

1. Field of the Invention

The present invention relates generally to methods and systems for processing billing records and, more particularly, to methods and systems for processing professional and technical medical billing records.

2. Related Art

Medical facilities use medical billing systems to collect and process information needed to prepare claims relating to medical care provided to patients. These claims are submitted to payers such as insurance companies, Medicare, and patients. Many medical facilities, especially outpatient clinics in hospitals, use "split billing" charge practices. Split billing refers to the practice of providing technical charges to a payer separately from professional charges for each patient encounter at the medical facility. Professional charges refer to charges for services rendered by physicians and other professional medical providers for each patient encounter. Technical charges refer to charges for use of facilities, clinical staff time, procedures performed by clinical staff, medications, and supplies used in the course of care for a patient.

Clinical staff members of the medical facility are typically responsible for documenting technical charges. Clinical staff includes nurses, medical assistants, and other personnel who interact with patients and deliver services that are billable as technical charges.

The technical charges for a patient encounter are usually closely related to the professional charges. Typically, all professional charges have a corresponding technical component. For example, procedures performed by a physician at the medical facility typically involve technical charges for use of facilities, staff time, and medications and other supplies used in the procedure. Even in an evaluation and management (E/M) visit, activities such as use of an examination room, chart preparation, and patient education can typically be billed as technical charges. Because the technical charges are closely related to the professional charges, attempts are made to document these charges together for each patient encounter.

Billing codes are used in medical billing records to represent details of medical charges. The billing codes used in professional billing records are generally standardized in the industry. Commonly used professional billing code lists include CPT-4 codes (Current Procedural Terminology, Version 4—maintained by the American Medical Association), HCPCS (Healthcare Common Procedure Coding System) codes, and ICD-9-CM (International Classification of Diseases, Ninth Revision, Clinical Modification) codes.

Technical billing codes, however, are not generally standardized and vary among medical institutions. The technical billing codes are typically maintained by each institution in a so called charge description master (CDM) database, which is also called a Charge Master. Each code in the Charge Master typically identifies the medical charge and the part of the medical institution to which the charge should be attributed. (Medical institutions typically have multiple departments and groups.) The Charge Master codes also specify unit prices for each type of service, medication, or product used in providing care. There are typically tens of thousands of CDM codes.

BRIEF SUMMARY OF EMBODIMENTS OF THE INVENTION

In accordance with one or more embodiments of the invention, a computer implemented method is provided for processing professional and technical billing records relating to medical care provided to patients at a medical facility. The method includes the steps of: (a) providing at a computer system a mapping of a set of professional billing codes and corresponding technical billing codes; (b) receiving at the computer system a professional billing record provided by a professional medical provider relating to medical services provided by the professional medical provider to a patient, the professional billing record comprising one or more professional billing codes; (c) identifying one or more technical billing codes corresponding to the one or more professional billing codes received in step (b) using the mapping, and providing the one or more technical billing codes to a user entering technical charges to a technical billing record to facilitate entry of technical charges relating to the medical care provided to the patient; (d) receiving at the computer system the technical billing record provided by the user, the technical charges comprising one or more technical billing codes; and (e) automatically reconciling the professional billing record and the technical billing record at the computer system to facilitate identification of errors or omissions in the one or more technical billing codes or the one or more professional billing codes.

In accordance with one or more embodiments of the invention, a system is provided for processing professional and technical billing records relating to medical care provided to patients at a medical facility. The system comprises a memory storing a mapping of a set of professional billing codes and corresponding technical billing codes, and a computer system connected to the memory for receiving the mapping. The computer system also receives a professional billing record provided by a professional medical provider relating to medical services provided by the professional medical provider to a patient. The professional billing record comprises one or more professional billing codes. The computer system identifies one or more technical billing codes corresponding to the one or more professional billing codes of the professional billing record using the mapping. The computer system provides the one or more technical billing codes to a user entering technical charges to a technical billing record to facilitate entry of technical charges relating to the medical care provided to the patient. The computer system receives the technical billing record provided by the user. The technical charges comprise one or more technical billing codes. The computer system automatically reconciles the professional billing record and the technical billing record to facilitate identification of errors or omissions in the one or more technical billing codes or the one or more professional billing codes.

In accordance with one or more embodiments of the invention, a computer program product for processing professional and technical billing records relating to medical care provided to patients at a medical facility is provided. The computer program product resides on a computer readable medium having a plurality of instructions stored thereon which, when executed by a computer processor, cause that computer processor to: receive a professional billing record provided by a professional medical provider relating to medical services provided by the professional medical provider to a patient, the professional billing record comprising one or more professional billing codes; identify one or more technical billing codes corresponding to the one or more professional billing codes of the professional billing record using a mapping of a set of professional billing codes and corresponding technical billing codes, and provide the one or more technical billing codes to a user entering technical charges to a technical billing record to facilitate entry of technical charges relating to the medical care provided to the patient; receive at the computer system the technical billing record provided by the user, the technical charges comprising one or more technical billing codes; and automatically reconcile the professional billing record and the technical billing record at the computer system to facilitate identification of errors or omissions in the one or more technical billing codes or the one or more professional billing codes.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

FIG. 3 is an example of a screenshot illustrating data in a technical charge record in accordance with one or more embodiments of the invention.

FIG. 4 shows an exemplary screen shot of a patient visit section of a technical charge record in accordance with one or more embodiments of the invention.

FIG. 5 is an exemplary screen shot of a dialog box that can be used to add technical codes in a technical billing record in accordance with one or more embodiments of the invention.

DETAILED DESCRIPTION

Various embodiments of the present invention are directed to methods and systems for processing professional and technical billing records that allow charges for services delivered and supplies utilized to be more easily and accurately captured. The billing methods and systems provide a mapping of technical and professional billing codes, which allows rapid automatic propagation of technical charge codes to the point of care, thereby reducing coding errors.

Figure 1:
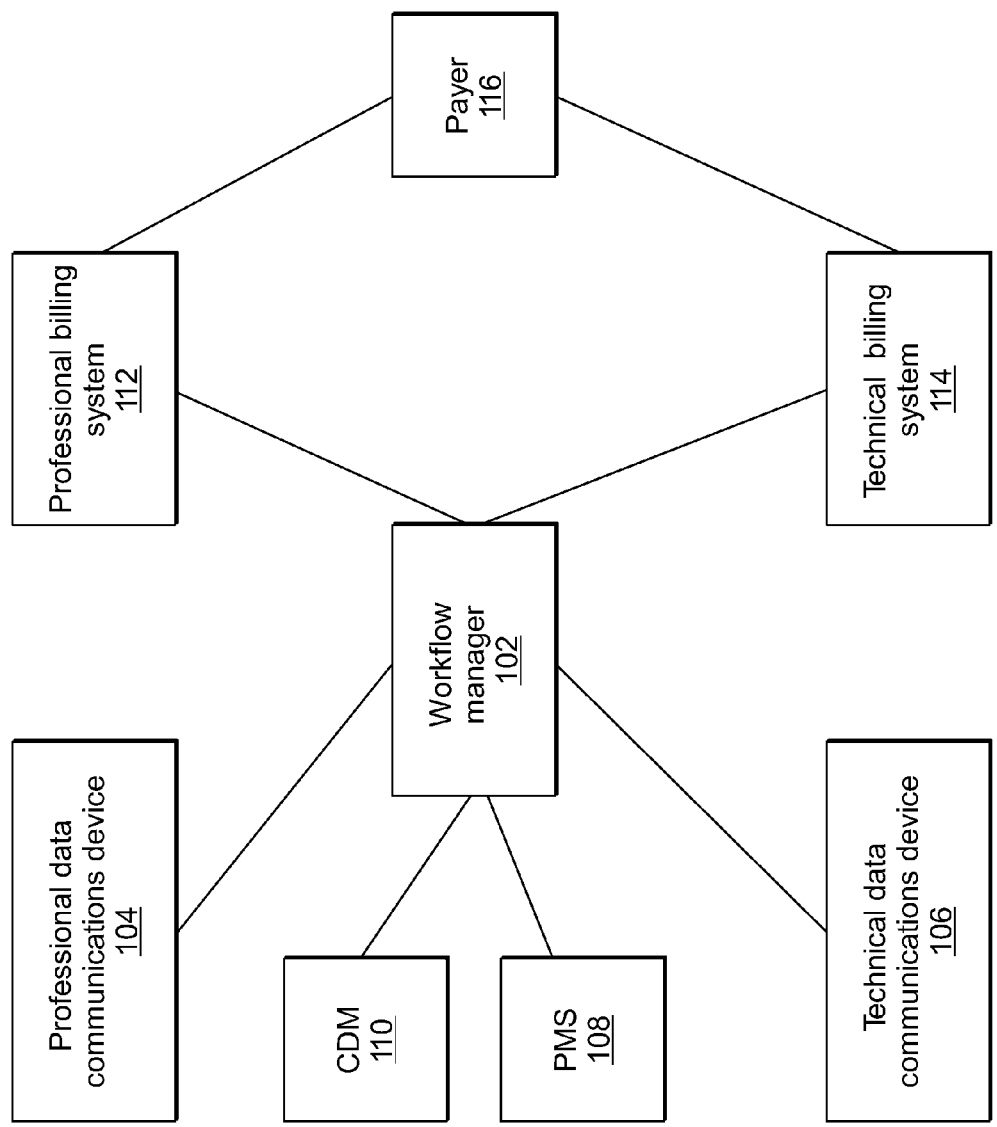
FIG. 1 is simplified block diagram illustrating a system for processing medical billing records in accordance with one or more embodiments of the invention.

FIG. 1 is a simplified block diagram illustrating a system 100 for processing medical billing records in accordance with one or more embodiments of the invention. Briefly, the system includes a workflow manager 102, which processes professional and technical billing records. The professional billing records are generated using one or more data communications devices 104 for entering professional billing charges. The technical billing records are generated using one or more data communications devices 106 for entering technical billing charges. The data communications devices 104, 106 can be a variety of computing devices including, but not limited to, workstations, portable handheld PDA (personal digital assistant) devices, and tablet PCs.

Patient scheduling and registration data is periodically sent from a practice management system (PMS) 108 to physicians and clinical staff to be displayed on data communications devices 104, 106, respectively. PMS 108 communicates with the interface gateway of the workflow manager 102. The workflow manager 102 then sends patient scheduling and registration information to the data communications devices 104, 106. (Alternatively, the patient scheduling and registration information can be send directly from the PMS 108 to the data communications devices 104, 106.)

A charge data master system 110, which contains a list of current technical charge codes, transfers updated charge data master files to the workflow manager 102. The updated data can be transferred on an automated basis, a scheduled basis or by manual initiation.

Once the professional and technical billing records have been processed at the workflow manager 102, they are submitted to professional and technical billing systems 112, 114, respectively. The billing systems 112, 114 submit respective billing claims to payers 116.

The various components of the system 100 can be connected using communication channels such as, e.g., Internet, intranet, or other network connection. Mobile data communications devices 104, 106 can periodically exchange data with a server connected to the system or may be wirelessly linked to the system.

Figure 2:
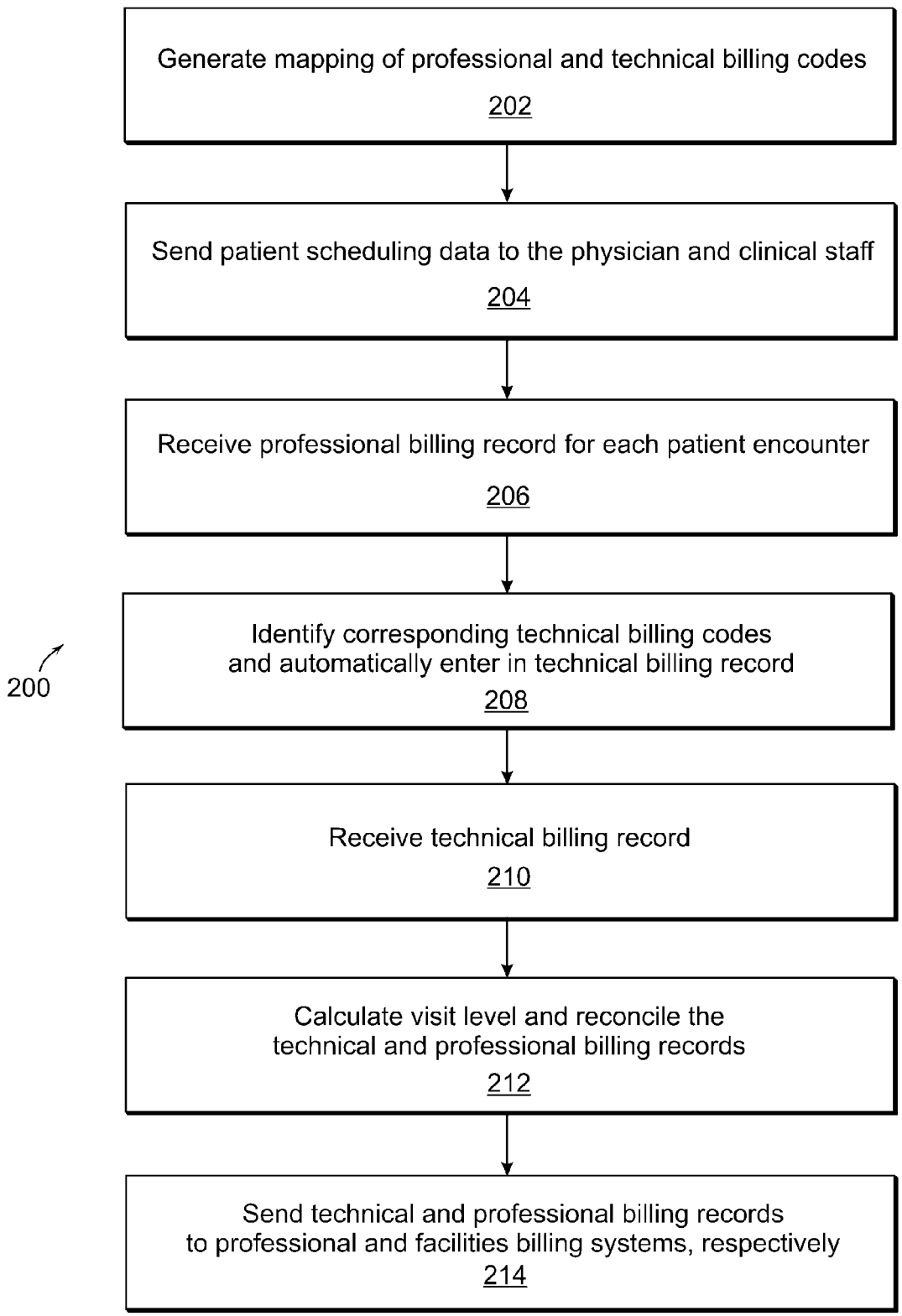
FIG. 2 is a flowchart illustrating a method for processing billing records in accordance with one or more embodiments of the invention.

FIG. 2 is a flow chart illustrating a method 200 for processing technical and professional billing records in accordance with one or more embodiments of the invention.

At step 202, a mapping of professional billing codes to associated technical billing codes is generated, e.g., manually, and sent to the workflow manager 102. The mapping associates each professional billing code (e.g., CPT-4, ICD-9-CM, and HCPCS codes) with one or more expected technical billing codes from the Charge Master. This mapping is periodically updated as there are frequent technical code changes.

At step 204, the PMS 108 sends patient scheduling data to the physician (e.g., downloaded on data communications device 104) and to clinical staff (e.g., at data communications device 106). This data identifies the patients to be seen at the medical facility, e.g., for that day. The data can be periodically updated or when changed.

The physician provides medical services to a patient identified in the scheduling data at the medical facility and documents the patient encounter, e.g., on his handheld device or at a workstation 104. The record generated by the physician includes the patient ID and the professional billing codes for procedures performed by the physician (including any E/M services rendered) and diagnoses made by the physician. The record is sent to the workflow manager 102 at step 206.

Technical charges for the medical encounter are entered by clinical staff and also sent to the workflow manager 102. The technical charges include one or more Charge Master technical codes. Technical charges can include, e.g., the time and effort required by the clinical staff to treat the patient, procedures performed by the clinical staff, drugs and materials used in treating the patient, medications provided to the patient, and any diagnoses. If the physician has already entered his professional billing record for services provided to a given patient, data from the professional billing record including the patient ID and professional billing codes is used by the workflow manager to populate the technical billing record. (The clinical staff using data communications device 106 can view, but preferably not change, the professional charges entered by the physician.) In addition, based on the professional codes entered by the physician, the workflow manager identifies appropriate technical codes and automatically inserts the technical codes in the technical charge record at step 208. (Clinical staff preferably may not alter or remove technical codes derived from the professional charge.)

FIG. 3 is an example of a screenshot 300 illustrating data in a technical charge record. The screenshot shows procedures and diagnoses recorded in the technical charge record. (In this illustration, the visit section is shown collapsed.) Charge entries 306, 308 are examples of entries in the technical charge record have been populated by the workflow manager based on the professional charges previously entered by the physician.

At step 210 (FIG. 2), the clinical staff input into the technical billing record any clinical staff-only procedures performed preferably using pick lists of technical codes provided by the workflow manager. FIG. 5 is an exemplary screen shot of a dialog box 500 that is raised when the user clicks on the "Add" button 302 shown in FIG. 3 in order to add technical codes for staff only procedures. The dialog box 500 provides a pick list of technical codes to help clinical staff quickly and accurately find the appropriate technical codes to be entered. Alternately, the clinical staff can use a code lookup mechanism to find the appropriate code. Charges 310, 312 in the technical charge record are examples of clinical staff-only charges input by the clinical staff.

In addition, clinical staff users enter the facilities utilization time by the patient. FIG. 4 shows an exemplary screen shot of a visit section 400, which can be expanded from the "Visit" button 304 shown in FIG. 3. The section 400 allows users to select an appropriate facilities utilization time for the technical billing record. The technical billing record is then sent to the workflow manager.

It should be understood that step 210 (at which the clinical staff input into the technical billing record any clinical staff only procedures) can be performed prior to steps 206 (at which the professional billing record is sent to the workflow manager) or 208 (at which technical billing codes corresponding to entered professional codes are identified and automatically entered in the technical billing record). In accordance with one or more embodiments of the invention, when a technical charge for a patient visit is entered before a professional charge, the technical charge is held until the professional charge arrives (when a professional charge is expected for the visit). In that case, when the professional charge arrives, the appropriate technical codes are inserted using the mapping of professional and technical billing codes. The completed technical charge is then flagged as ready for reconciliation and review.

At step 212 (FIG. 2), the workflow manager automatically calculates the technical visit level based on the entered data. In accordance with one or more embodiments of the invention, the technical level is based particularly the facilities utilization time by the patient and the presence or absence of previous charges for the patient at the facility. (In one or more embodiments, if the patient has a medical record at the facility, the patient is an established patient for purposes of the technical charge, regardless of whether the patient is a new patient for the professional charge.) The workflow manager also automatically reconciles the technical and professional billing records using a cross reconciliation engine. In one reconciliation action performed by the workflow manager, a determination is made as to whether any rules relating to the codes have been violated to detect errors or omissions. The rules can specify which codes are appropriate in given situations. A rule can specify, e.g., that if a professional billing code was entered by the physician for the act of administering a drug to the patient, then there must also be a corresponding technical charge for the drug itself.

In another reconciliation action performed by the workflow manager, a determination is made as to whether the number of patients expected to be charged have in fact been charged. In accordance with one or more embodiments, the workflow manager checks whether the number of patients seen at the medical facility matches the number of patients charged.

In accordance with one or more embodiments of the invention, each patient appointment scheduled by the PMS 108 is assigned to a "location", and the location has the attribute of being one of the following: "professional encounter expected," "professional and technical encounter expected," or "technical encounter expected." Based on that location attribute, each appointment can be classified as charged, uncharged, or not applicable with respect to professional charges or technical charges.

Reconciliation identifies errors or omissions in the charges entered by the physician or the clinical staff, and gives system administrators the opportunity to resolve with the physician and/or clinical staff any such errors or omissions. Once resolved, the charges are forwarded to respective professional and facilities billing systems at step 214.

The respective billing systems clean up the claims and send them to the payer, which can be, e.g., insurance companies, patients, and Medicare.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components of the billing system described herein may be further divided into additional components or joined together to form fewer components for performing the same functions.

The techniques described above may be implemented, e.g., in hardware, software, firmware, or any combination thereof. The techniques described above may be implemented in one or more computer programs executing on a programmable computer including a processor, a storage medium readable by the processor (including, e.g., volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, including assembly language, machine language, a high-level procedural programming language, or an object-oriented programming language. The programming language may, e.g., be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, e.g., all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Having described preferred embodiments of the present invention, it should be apparent that modifications can be made without departing from the spirit and scope of the invention.

Method claims set forth below having steps that are numbered or designated by letters should not be considered to be necessarily limited to the particular order in which the steps are recited.

What is claimed is:

1. A computer implemented method for processing professional and technical billing records relating to medical care provided to patients at a medical facility, the professional and technical billing records capturing charges to be submitted to a payer, the method comprising:
   (a) providing at a computer system a mapping of a set of professional billing codes and corresponding technical billing codes;
   (b) receiving at the computer system a professional billing record provided by a professional medical provider relating to medical services provided by the professional medical provider to a patient, said professional billing record comprising one or more professional billing codes;
   (c) identifying by the computer system one or more technical billing codes corresponding to the one or more professional billing codes received in step (b) using the mapping, populating by the computer system a technical billing record with the one or more technical billing codes, and providing the technical billing record to a user entering technical charges to facilitate entry of technical charges relating to the medical care provided to the patient;
   (d) receiving at the computer system the technical billing record provided by said user, said technical charges comprising one or more technical billing codes; and
   (e) automatically reconciling by the computer system the professional billing record and the technical billing record to facilitate identification of errors or omissions in the one or more technical billing codes or the one or more professional billing codes.

2. The method of claim 1 wherein reconciling the professional billing record and the technical billing record comprises applying rules relating to the professional billing codes and the technical billing codes to detect errors or omissions in the codes.

3. The method of claim 1 wherein reconciling the professional billing record and the technical billing record comprises determining whether the number of charges received by the computer system matches an expected number of charges.

4. The method of claim 1 further comprising periodically updating the mapping.

5. The method of claim 1 further comprising automatically calculating a technical visit level relating to facilities utilization based on the technical billing record.

6. The method of claim 1 further comprising transmitting the professional and technical billing records to professional and technical billing systems, respectively.

7. The method of claim 1 wherein the professional billing codes comprise CPT-4 (Current Procedural Terminology, Version 4) codes, HCPCS (Healthcare Common Procedure Coding System) codes, or ICD-9-CM (International Classification of Diseases, Ninth Revision, Clinical Modification) codes.

8. The method of claim 1 wherein the technical billing codes comprise Charge Master codes.

9. The method of claim 1 wherein providing the one or more technical billing codes comprises automatically inserting the one or more technical billing codes in the technical billing record.

10. The method of claim 1 wherein providing the one or more technical billing codes comprises providing a pick list of one or more technical billing codes based on the one or more professional billing codes to facilitate entry of technical charges by the user.

11. A system for processing professional and technical billing records relating to medical care provided to patients at a medical facility, the professional and technical billing records capturing charges to be submitted to a payer, the system comprising:
   a storage device storing a mapping of a set of professional billing codes and corresponding technical billing codes; and
   a computer system connected to said storage device for receiving said mapping; said computer system also receiving a professional billing record provided by a professional medical provider relating to medical services provided by the professional medical provider to a patient, said professional billing record comprising one or more professional billing codes; said computer system identifying one or more technical billing codes corresponding to the one or more professional billing codes of the professional billing record using the mapping, and populating a technical billing record with the identified one or more technical billing codes; said computer system providing the technical billing record to a user entering technical charges to facilitate entry of technical charges relating to the medical care provided to the patient; said computer system receiving the technical billing record provided by said user, said technical charges comprising one or more technical billing codes; and said computer system automatically reconciling the professional billing record and the technical billing record to facilitate identification of errors or omissions in the one or more technical billing codes or the one or more professional billing codes.

12. The system of claim 11 wherein the computer system reconciles the professional billing record and the technical billing record by applying rules relating to the professional billing codes and the technical billing codes to detect errors or omissions in the codes.

13. The system of claim 11 wherein the computer system reconciles the professional billing record and the technical billing record by determining whether the number of charges received by the computer system matches an expected number of charges.

14. The system of claim 11 wherein the computer system periodically receives an updated mapping.

15. The system of claim 11, wherein the computer system automatically calculates a technical visit level relating to facilities utilization based on the technical billing record.

16. The system of claim 11 wherein the computer system transmits the professional and technical billing records to professional and technical billing systems, respectively.

17. The system of claim 11 wherein the professional billing codes comprise CPT-4 (Current Procedural Terminology, Version 4) codes, HCPCS (Healthcare Common Procedure Coding System) codes, or ICD-9-CM (International Classification of Diseases, Ninth Revision, Clinical Modification) codes.

18. The system of claim 11 wherein the technical billing codes comprise Charge Master Codes.

19. The system of claim 11 wherein the computer system automatically inserts the one or more technical billing codes in the technical billing record.

20. The system of claim 11 wherein the computer system provides a pick list of one or more technical billing codes based on the one or more professional billing codes to facilitate entry of technical charges by the user.

21. The system of claim 11 further comprising a data communications device operable by the professional medical provider for transmitting the professional billing record to said computer system, and further comprising a data communications device operable by the user for transmitting the technical billing record to said computer system.

22. A computer program product for processing professional and technical billing records relating to medical care provided to patients at a medical facility, the professional and technical billing records capturing charges to be submitted to a payer, said computer program product residing on a computer readable medium having a plurality of instructions stored thereon which, when executed by a computer processor, cause that computer processor to:
receive a professional billing record provided by a professional medical provider relating to medical services provided by the professional medical provider to a patient, said professional billing record comprising one or more professional billing codes;
identify one or more technical billing codes corresponding to the one or more professional billing codes of said professional billing record using a mapping of a set of professional billing codes and corresponding technical billing codes, populate a technical billing record with the one or more technical billing codes, and provide the technical billing record to a user entering technical charges to facilitate entry of technical charges relating to the medical care provided to the patient;
receive at the computer system the technical billing record provided by said user, said technical charges comprising one or more technical billing codes; and
automatically reconcile the professional billing record and the technical billing record at the computer system to facilitate identification of errors or omissions in the one or more technical billing codes or the one or more professional billing codes.

23. The computer program product of claim 22 wherein the professional billing record and the technical billing record are reconciled by applying rules relating to the professional billing codes and the technical billing codes to detect errors or omissions in the codes.

24. The computer program product of claim 22 wherein the professional billing record and the technical billing record are reconciled by determining whether the number of charges received by the computer system matches an expected number of charges.

25. The computer program product of claim 22 wherein the mapping is periodically updated.

26. The computer program product of claim 22 further comprising instructions for automatically calculating a technical visit level relating to facilities utilization based on the technical billing record.

27. The computer program product of claim 22 further comprising instructions for transmitting the professional and technical billing records to professional and technical billing systems, respectively.

28. The computer program product of claim 22 wherein the professional billing codes comprise CPT-4 (Current Procedural Terminology, Version 4) codes, HCPCS (Healthcare Common Procedure Coding System) codes, or ICD-9-CM (International Classification of Diseases, Ninth Revision, Clinical Modification) codes.

29. The computer program product of claim 22 wherein the technical billing codes comprise Charge Master codes.

30. The computer program product of claim 22 further comprising instructions for automatically inserting the one or more technical billing codes in the technical billing record.

31. The computer program product of claim 22 further comprising instructions for providing a pick list of one or more technical billing codes based on the one or more professional billing codes to facilitate entry of technical charges by the user.

* * * * *